(12) United States Patent
Murakami (10) Patent No.: US 11,527,969 B2
(45) Date of Patent: Dec. 13, 2022

(54) PIEZOELECTRIC DRIVE DEVICE AND CONTROL METHOD THEREFOR

(71) Applicant: SEIKO EPSON CORPORATION, Tokyo (JP)

(72) Inventor: Makoto Murakami, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 138 days.

(21) Appl. No.: 17/200,934

(22) Filed: Mar. 15, 2021

(65) Prior Publication Data

US 2021/0288595 A1    Sep. 16, 2021

(30) Foreign Application Priority Data

Mar. 16, 2020 (JP) .............................. JP2020-045059

(51) Int. Cl.
*H02N 2/06* (2006.01)
*H02N 2/02* (2006.01)

(52) U.S. Cl.
CPC ............. *H02N 2/062* (2013.01); *H02N 2/026* (2013.01)

(58) Field of Classification Search
CPC .......... H02N 2/062; H02N 2/026; H02N 2/06; H02N 2/004; H02N 2/04
See application file for complete search history.

(56) References Cited

U.S. PATENT DOCUMENTS

| 10,833,610 B2 * | 11/2020 | Sumioka ................ H02N 2/142 |
| 2004/0013420 A1 | 1/2004 | Hara |
| 2008/0180476 A1 * | 7/2008 | Igarashi ............... B41J 2/04503 |
| | | 347/14 |

FOREIGN PATENT DOCUMENTS

| JP | 2004056878 A | 2/2004 |
| JP | 2004064949 A | 2/2004 |

* cited by examiner

*Primary Examiner* — Emily P Pham
(74) *Attorney, Agent, or Firm* — Gang Yu (57) ABSTRACT

A control unit of a piezoelectric drive device calculates a maximum deceleration α applied to a driven part by the piezoelectric drive device using a friction force F2max between the piezoelectric drive device and the driven part and a mass m of the driven part, calculates a distance Ln to a target position from a present position of the driven part detected by a position sensor, calculates a reference velocity vth of the driven part using the maximum deceleration α and the distance Ln from the present position of the driven part to the target position, calculates a velocity vn of the driven part from a temporal change of the present position of the driven part detected by the position sensor, and performs control to apply a drive force from the piezoelectric drive device to the driven part when the present velocity vn of the driven part is lower than the reference velocity vth, and apply a brake force from the piezoelectric drive device to the driven part when the present velocity vn is equal to or higher than the reference velocity vth.

10 Claims, 10 Drawing Sheets

PIEZOELECTRIC DRIVE DEVICE AND CONTROL METHOD THEREFOR

The present application is based on, and claims priority from JP Application Serial Number 2020-045059, filed Mar. 16, 2020, the disclosure of which is hereby incorporated by reference herein in its entirety.

BACKGROUND

1. Technical Field

The present disclosure relates to a piezoelectric drive device and a control method therefor.

2. Related Art

JP-A-2004-56878 discloses a position control technique for ultrasonic motor (piezoelectric motor). A drive device of an ultrasonic actuator includes a member sensor that detects a present position of a moving member, calculating means for calculating a control target position of the moving member, a drive circuit that generates a drive voltage for driving the ultrasonic actuator in a predetermined resonance state, and a control circuit that controls a state of motion of the moving member by adjusting one of physical quantities specifying the drive voltage according to a difference between the present position and the control target position as an operation physical quantity to make the moving member to follow the control target position.

However, in JP-A-2004-56878, inertia of the moving member is not considered. In a case where the inertia of the moving member is larger, when the same control as that when the inertia of the moving member is smaller is performed, there is a problem that it takes time for the member to stop at the target position.

SUMMARY

According to one aspect of the present disclosure, a control method for a piezoelectric drive device that drives a driven part is provided. The control method includes calculating a reference velocity vth of the driven part using a maximum deceleration α applied to the driven part by the piezoelectric drive device and a distance Ln from a present position of the driven part to a target position, and performing control to apply a drive force from the piezoelectric drive device to the driven part when a present velocity vn of the driven part is lower than the reference velocity vth, and apply a brake force from the piezoelectric drive device to the driven part when the present velocity vn is equal to or higher than the reference velocity vth.

DESCRIPTION OF EXEMPLARY EMBODIMENTS

A. First Embodiment

Figure 1:
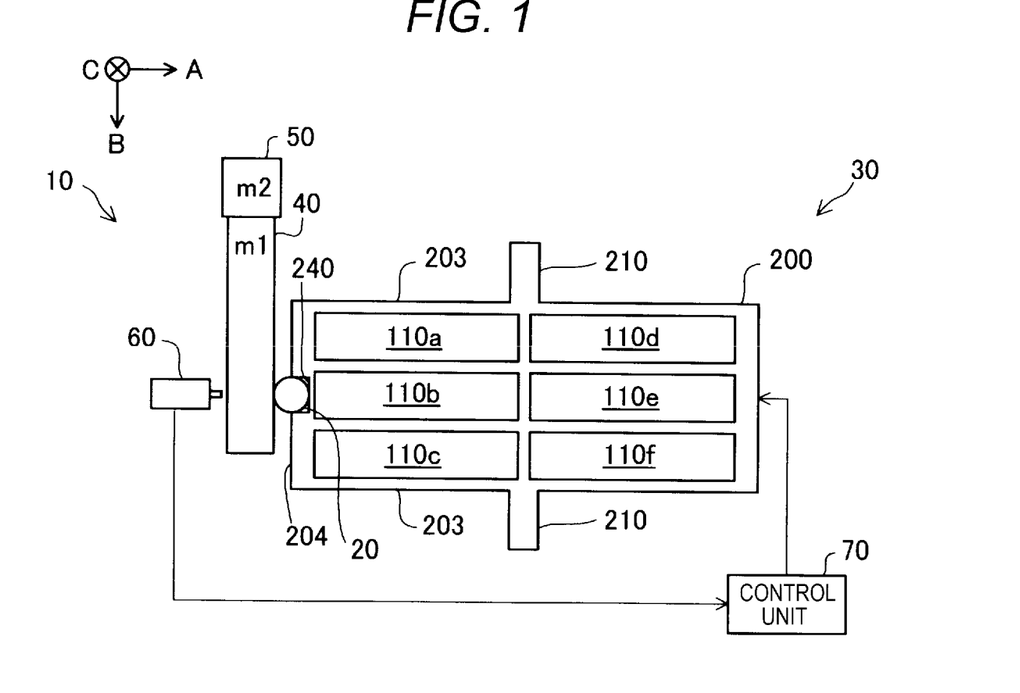
FIG. 1 is an explanatory diagram showing a piezoelectric drive device.

FIG. 1 is an explanatory diagram showing a piezoelectric drive device 10. The piezoelectric drive device 10 is used for carrying an object 50. The piezoelectric drive device 10 includes a piezoelectric drive device main body 30, a driven part 40, a position sensor 60, and a control unit 70. The piezoelectric drive device main body 30 includes a vibrating plate 200, six piezoelectric elements 110a, 110b, 110c, 110d, 110e, 110f and a projecting portion 20. The vibrating plate 200 has a substantially rectangular shape. The six piezoelectric elements 110a to 110f are arranged in a matrix form, specifically, two elements along a long side 203, i.e., an A direction in FIG. 1 and three elements along a short side 204, i.e., a B direction in FIG. 1. Supporting portions 210 are provided at outsides of positions corresponding to between the two piezoelectric elements arranged in the A direction of the vibrating plate 200, specifically, between the piezoelectric elements 110a and 110d and between the piezoelectric elements 110c and 110f. When voltages are applied to the piezoelectric elements 110a to 110f at appropriate times, the vibrating plate 200 flexurally moves at nodes on the supporting portions 210.

The vibrating plate 200 has a recessed portion 240 substantially at the center of the short side 204 and the projecting portion 20 is provided in the recessed portion 240. When the vibrating plate 200 makes flexural motion, the projecting portion 20 contacts and presses the driven part 40 and drives the driven part 40 in the B direction. The driven part 40 has a flat plate shape with a mass of m1. The object 50 having a mass m2 is mounted on the driven part 40, and carried with the movement of the driven part 40. The position sensor 60 acquires the position of the driven part 40.

Figure 2:
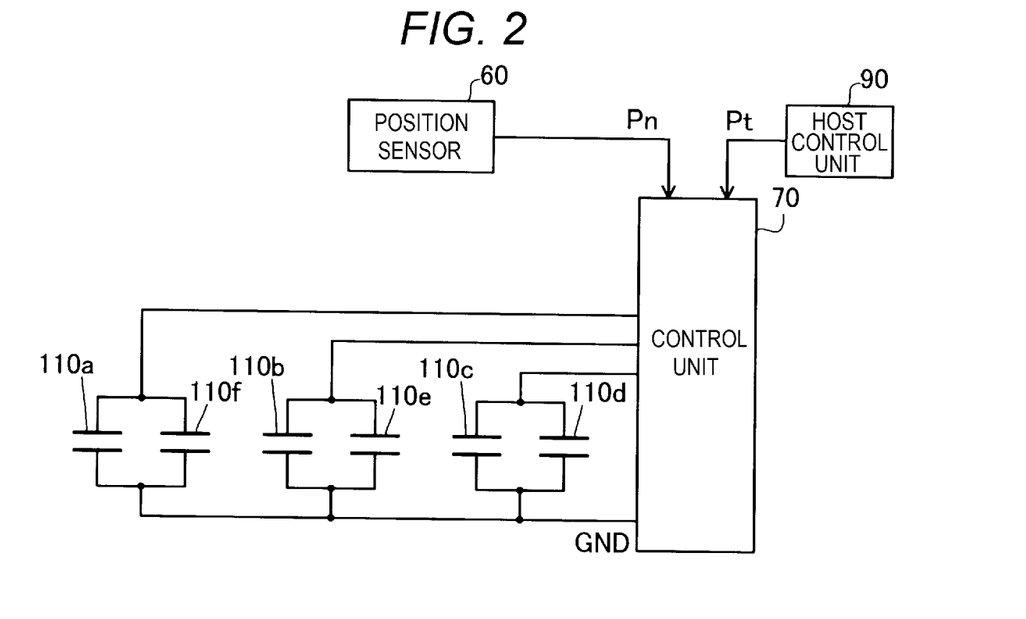
FIG. 2 is an explanatory diagram showing a schematic configuration of a control circuit of the piezoelectric drive device.

FIG. 2 is an explanatory diagram showing a schematic configuration of a control circuit of the piezoelectric drive device 10. In the piezoelectric drive device 10 of the embodiment, the piezoelectric elements 110*a* and 110*f* are coupled in parallel, the piezoelectric elements 110*b* and 110*e* are coupled in parallel, and the piezoelectric elements 110*c* and 110*d* are coupled in parallel to form three pairs. In the embodiment, the piezoelectric elements of the respective pairs are coupled in parallel, however, may be coupled in series. The three pairs are respectively coupled to the control unit 70. Note that the ground sides of the piezoelectric elements 110*a* to 110*f* are coupled in common. Thereby, the number of wires may be reduced. Or, the ground sides of the respective pairs may be independent. The position sensor 60 and a host control unit 90 are coupled to the control unit 70. The control unit 70 acquires a present position Pn of the driven part 40 from the position sensor 60, acquires a final target position Pt from the host control unit 90, and controls driving of the piezoelectric elements 110*a* to 110*f*.

Figure 3A:
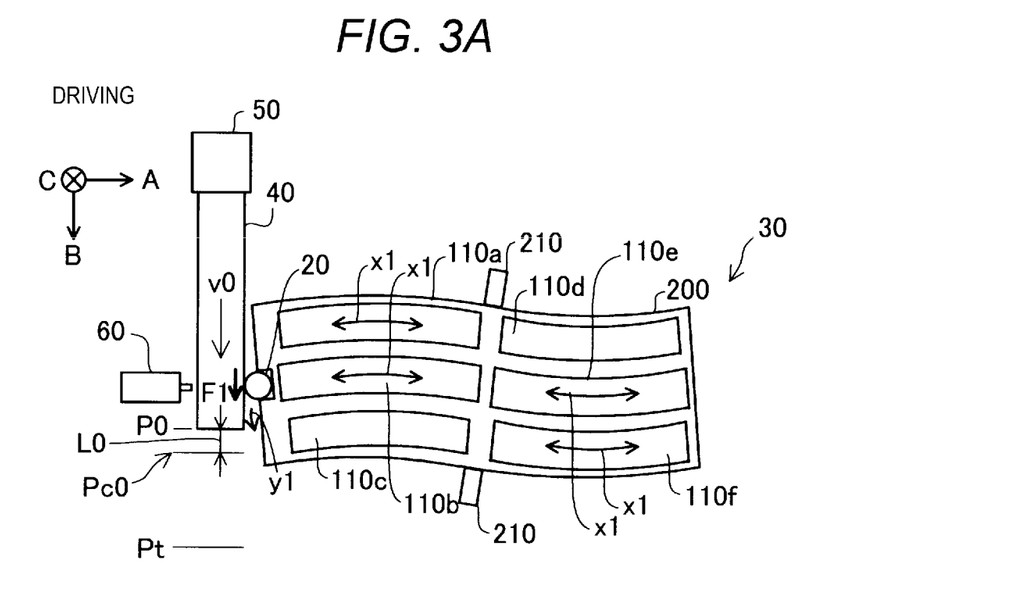
FIG. 3A is an explanatory diagram showing a movement of the piezoelectric drive device at driving in a first half of a vibration period.

FIG. 3A is an explanatory diagram showing a movement of the piezoelectric drive device 10 at driving in a first half of a vibration period. In the first half of the vibration period, a voltage is applied to the two piezoelectric elements diagonally placed in the vibrating plate 200, e.g. the piezoelectric element 110*a* and the piezoelectric element 110*f*. The piezoelectric element 110*a* and the piezoelectric element 110*f* extend as shown by arrows x1 and the vibrating plate 200 bends. The projecting portion 20 moves as shown by an arrow y1 by bending of the vibrating plate 200. Concurrently, a voltage is also applied to the two piezoelectric elements 110*b* and 110*e* at the center in the short side direction, and then, the piezoelectric element 110*b* and the piezoelectric element 110*e* also extend as shown by arrows x1. The projecting portion 20 contacts the driven part 40 and presses the driven part 40 with a force F1 (drive force F1) in the B direction. As a result, the driven part 40 is driven in the B direction. Note that the voltage application to the piezoelectric element 110*b* and the piezoelectric element 110*e* is not necessarily required. When the projecting portion 20 and the driven part 40 are placed in contact, the projecting portion 20 is in contact with the driven part 40 without voltage application.

The position of the driven part 40 before application of the drive force F1 is P0 and an intermediate target position at the end of the vibration period in the single vibration is Pc0. A distance L0 to the intermediate target position Pc0 is Pc0−P0. When the first half of the vibration period ends, the driven part 40 reaches a position P1. The position P1 is a position before the intermediate target position Pc0. The velocity of the driven part 40 in the B direction becomes higher from v0 to v1.

Figure 3B:
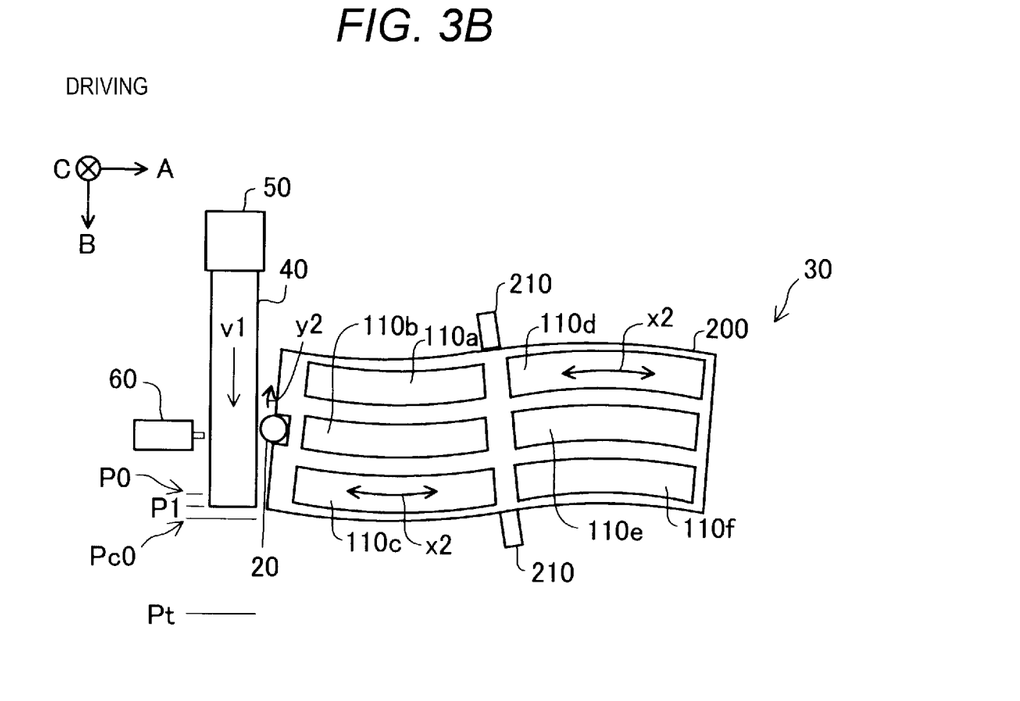
FIG. 3B is an explanatory diagram showing a movement of the piezoelectric drive device at driving in a second half of the vibration period.

FIG. 3B is an explanatory diagram showing a movement of the piezoelectric drive device 10 at driving in a second half of the vibration period. In the second half of the vibration period, a voltage is applied to the other two piezoelectric elements, the piezoelectric element 110*c* and the piezoelectric element 110*d* diagonally placed in the vibrating plate 200 and no voltage is applied to the other piezoelectric element 110*a*, piezoelectric element 110*b*, piezoelectric element 110*e*, and piezoelectric element 110*f*. The piezoelectric element 110*c* and the piezoelectric element 110*d* extend as shown by arrows x2, the vibrating plate 200 bends in the opposite direction, and the projecting portion 20 moves as shown by an arrow y2. However, no voltage is applied to the two piezoelectric elements 110*b* and 110*e* at the center in a lateral direction, and the projecting portion 20 is apart from the driven part 40 and does not press the driven part 40. As a result, even when the projecting portion 20 moves as shown by the arrow y2, no force is applied to the driven part 40. However, the driven part 40 moves at the velocity v1 by inertia and reaches the intermediate target position Pc0 at the end of the second half of the vibration period. Note that the projecting portion 20 may be separated from the driven part 40 by voltage application to the piezoelectric element 110*b* and the piezoelectric element 110*e* for compression of the elements.

Here, when the masses of the driven part 40 and the object 50 are smaller, that is, the inertia is smaller, the driven part 40 reaches the position P1 at the end of the first half of the vibration period and reaches the intermediate target position Pc0 at the end of the second half of the vibration period. However, when the masses of the driven part 40 and the object 50 are larger, that is, the inertia is larger, the driven part 40 does not reach the position P1 at the end of the first half of the vibration period and does not reach the intermediate target position Pc0 at the end of the second half of the vibration period.

In the next vibration period, a next intermediate target position PC2 of the driven part 40 is set and the part is driven in the same manner. Note that, when the position of the driven part 40 reaches Pc0 in the first vibration period, a distance L2 to the intermediate target position Pc2 is Pc2−Pc0. On the other hand, when the position of the driven part 40 does not reach Pc0, the distance L2 to the intermediate target position Pc2 is larger than Pc2−Pc0.

Figure 4A:
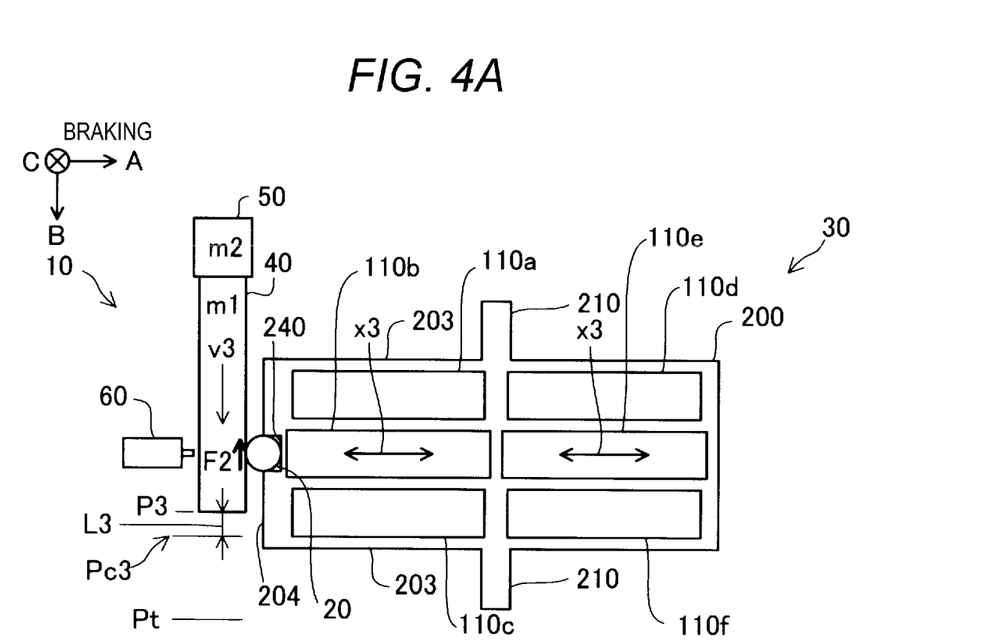
FIG. 4A is an explanatory diagram showing a movement of the piezoelectric drive device at braking in a first half of a vibration period.

FIG. 4A is an explanatory diagram showing a movement of the piezoelectric drive device 10 at braking in a first half of a vibration period. In the first half of the vibration period, a voltage is applied to the two piezoelectric elements at the center of the vibrating plate 200 in the lateral direction, specifically, the piezoelectric element 110*b* and the piezoelectric element 110*e*. The piezoelectric element 110*b* and the piezoelectric element 110*e* extend in the longitudinal directions as shown by arrows x3 and the vibrating plate 200 also extends in the longitudinal directions. Thereby, the projecting portion 20 contacts the driven part 40. The part is braked by a friction force F2 between the projecting portion 20 and the driven part 40. The friction force F2 is also referred to as "brake force F2".

The position of the driven part 40 before application of the friction force F2 is P3 and an intermediate target position at the end of the vibration period in the single vibration is Pc3. A distance L3 to the target position Pc3 is Pc3−P3. When the first half of the vibration period ends, the driven part 40 reaches a position P4. The position P4 is a position before the target position Pc3. The velocity of the driven part 40 in the B direction becomes lower from v3 to v4.

Figure 4B:
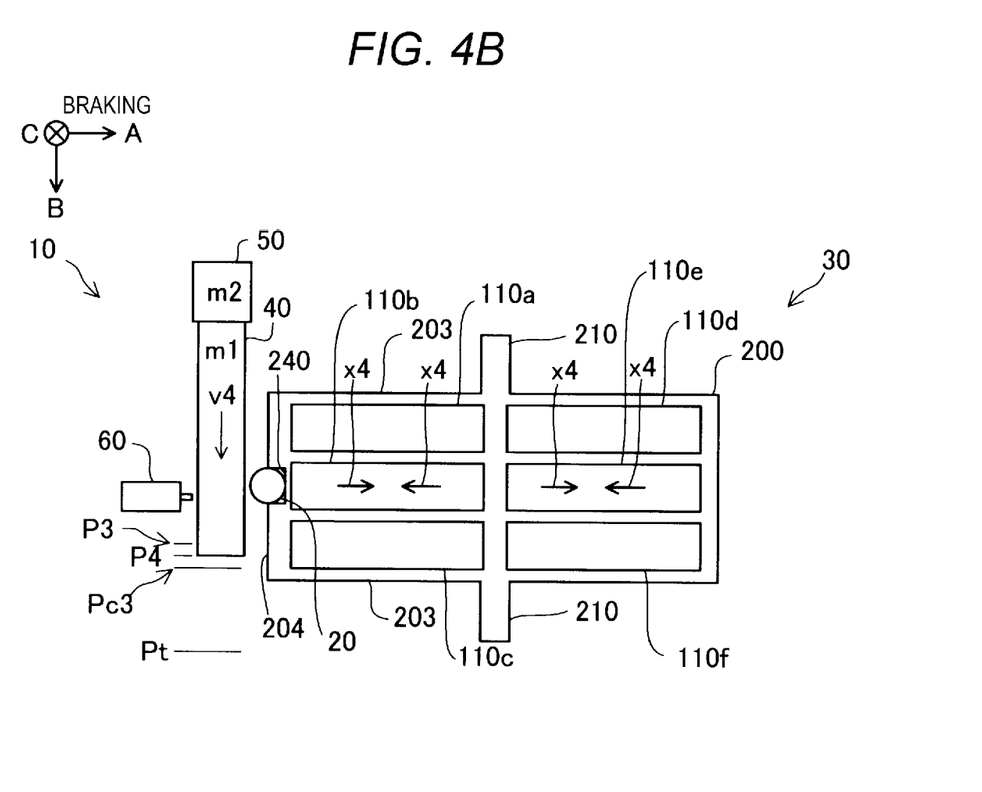
FIG. 4B is an explanatory diagram showing a movement of the piezoelectric drive device at braking in a second half of the vibration period.

FIG. 4B is an explanatory diagram showing a movement of the piezoelectric drive device 10 at braking in a second half of the vibration period. In the second half of the vibration period, the voltage application to the piezoelectric element 110*b* and the piezoelectric element 110*e* is stopped. The piezoelectric element 110*b* and the piezoelectric element 110*e* become shorter in the longitudinal directions as shown by arrows x4 and the vibrating plate 200 also becomes shorter in the longitudinal directions. Thereby, the projecting portion 20 does not contact the driven part 40 and does not apply the brake force F2 to the driven part 40. However, the driven part 40 moves by inertia at the velocity v4 and reaches the intermediate target position Pc3 at the end of the second half of the vibration period. Note that, when the projecting portion 20 is placed in contact with the driven part 40, the projecting portion 20 may be separated from the driven part 40 by voltage application to the piezoelectric element 110b and the piezoelectric element 110e for compression of the elements in the longitudinal directions as shown by the arrows x4.

Here, when the masses of the driven part 40 and the object 50 are smaller, that is, the inertia is smaller, the driven part 40 reaches the position P4 at the end of the first half of the vibration period and reaches the intermediate target position Pc3 at the end of the second half of the vibration period. However, when the masses of the driven part 40 and the object 50 are larger, that is, the inertia is larger, the driven part 40 overshoots the position P4 at the end of the first half of the vibration period and overshoots the intermediate target position Pc3 at the end of the second half of the vibration period. Note that the present disclosure provides control that enables the driven part 40 to stop at the final target position Pt even when the inertia of the part is larger. Therefore, the driven part 40 may overshoot the intermediate target position in the middle to the final target position Pt as long as the driven part 40 may stop at the final target position Pt.

Figure 5:
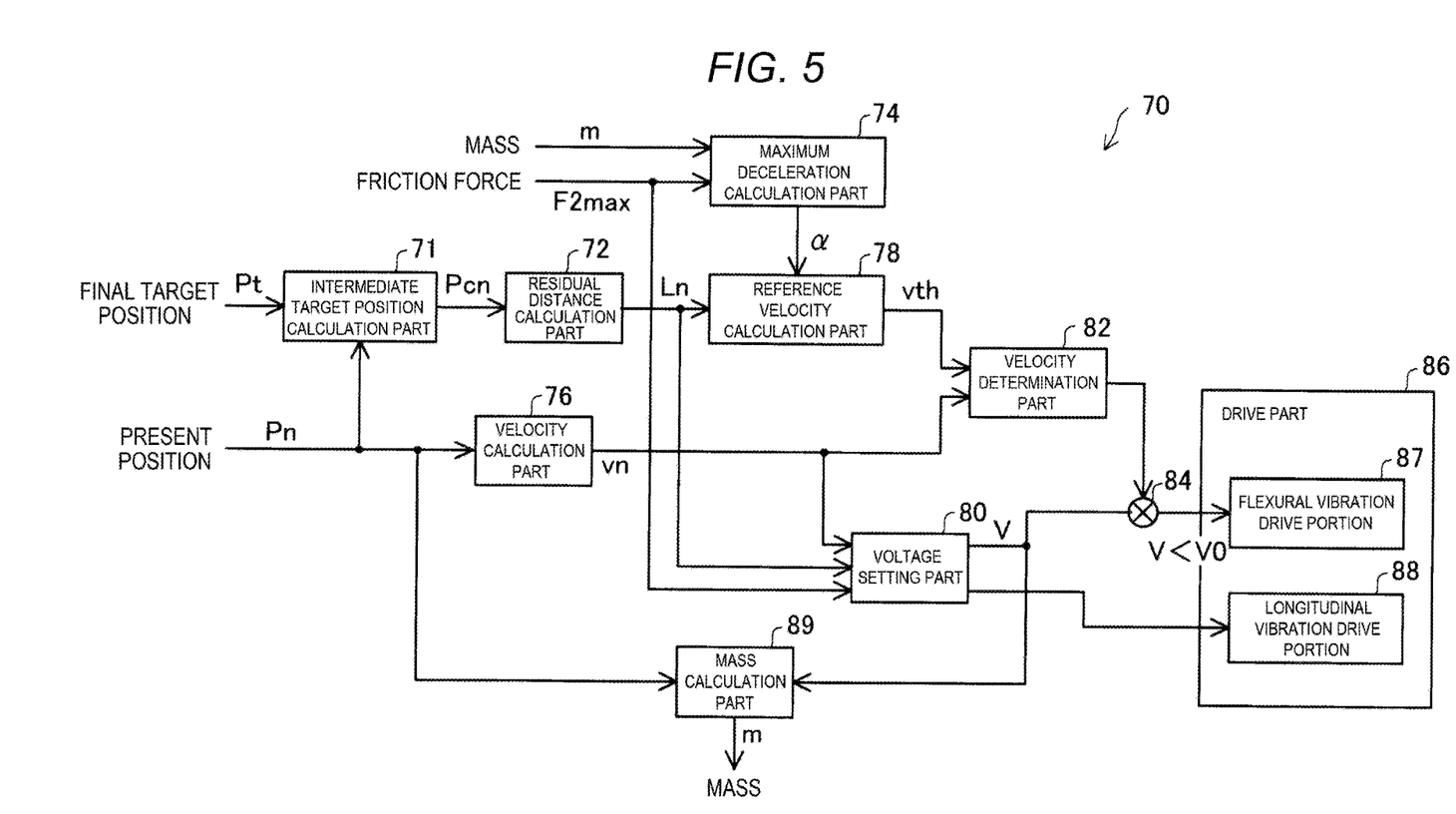
FIG. 5 is an explanatory diagram showing a configuration of a control unit.

FIG. 5 is an explanatory diagram showing a configuration of the control unit 70. The control unit 70 includes an intermediate target position calculation part 71, a residual distance calculation part 72, a maximum deceleration calculation part 74, a velocity calculation part 76, a reference velocity calculation part 78, a voltage setting part 80, a velocity determination part 82, a switch 84, and a drive part 86.

In this specification, time taken for single position control is referred to as "one cycle". The intermediate target position calculation part 71 calculates an intermediate target position Pcn after one cycle using the final target position Pt acquired from the host control unit 90 and the present position Pn acquired from the position sensor 60. The residual distance calculation part 72 calculates a distance Ln to an intermediate target as a difference between the intermediate target position Pcn after one cycle and the present position Pn. That is, $$Ln = Pcn - Pn \qquad (1).$$

The maximum deceleration calculation part 74 calculates a maximum deceleration α of the driven part 40 using a mass m and a maximum friction force F2max by the following expression. The maximum friction force F2max is also referred to as "maximum brake force F2max"

$$\alpha = F2max/m \qquad (2).$$

Here, the mass m is a sum of the mass m1 of the driven part 40 and the mass m2 of the object 50. The mass m1 of the driven part 40 is known. The mass m2 of the object 50 to be carried by the driven part 40 is not known, but may be easily calculated as will be described later. The maximum friction force F2max is a friction force between the projecting portion 20 and the driven part 40, can be measured by an experiment and known.

The velocity calculation part 76 calculates a velocity vn of the driven part 40 from a temporal change of the present position Pn.

The reference velocity calculation part 78 calculates a reference velocity vth using the distance Ln to the target and the maximum deceleration α by the following expression:

$$vth = (2 \cdot \alpha \cdot Ln)^{1/2} \qquad (3).$$

When the velocity vn of the driven part 40 is the reference velocity vth, the driven part 40 may be decelerated at the deceleration α and stopped at the final target position Pt by application of the maximum friction force F2max from the driven part 40 to the projecting portion 20.

The voltage setting part 80 calculates a voltage V of a drive signal for driving the piezoelectric elements 110a to 110f using the distance Ln to the intermediate target position Pcn and the present velocity vn of the driven part 40. This voltage V corresponds to the drive force F1 and the brake force F2. The voltage setting part 80 sets the voltage to be higher as the distance Ln to the intermediate target position Pcn is larger and sets the voltage to be lower as the present velocity vn of the driven part 40 is higher. Note that, when the voltage V is higher than a voltage Vlim at which the friction force between the projecting portion 20 and the driven part 40 generates a maximum friction force F1max or F2max, the voltage is limited to the voltage Vlim. Sliding between the projecting portion 20 and the driven part 40 may be suppressed. The maximum friction forces F1max and F2max are predetermined known values.

The velocity determination part 82 compares the present velocity vn of the driven part 40 with the reference velocity vth and, when vn<vth, turns on the switch 84, which will be described later and, when vn≥vth, turns off the switch 84 to be described later.

The switch 84 turns on a drive signal for the drive part 86 to execute flexural vibration when vn<vth, and turns off the drive signal for the drive part 86 to execute flexural vibration when vn vth. A drive signal for the drive part 86 to execute longitudinal vibration is not turned off depending on a magnitude relationship between the present velocity vn of the driven part 40 and the reference velocity vth.

The drive part 86 includes a flexural vibration drive portion 87 and a longitudinal vibration drive portion 88. The flexural vibration drive portion 87 drives the piezoelectric elements 110a, 110c, 110d, 110f and the longitudinal vibration drive portion 88 drives the piezoelectric elements 110b, 110e. The piezoelectric elements 110a, 110c, 110d, 110f flexurally vibrate the vibrating plate 200 and the piezoelectric elements 110b, 110e longitudinally vibrate the vibrating plate 200.

A mass calculation part 89 calculates the mass m. The mass calculation part 89 calculates the mass m using the position P0 before application of the drive force F1 to the driven part 40 and the position P1 after the application. Specifically, time for application of the drive force F1 is tst, an acceleration is β, and a distance between the position P0 and the position P1 is Lst.

Lst=β·(tst)²/2, and the mass calculation part 89 calculates the acceleration β by $$\beta = 2 \cdot Lst/(tst)^2 \qquad (4).$$

Further, a relationship among the force F1, the acceleration β, and the mass m is $$F1 = \beta \cdot m \qquad (5).$$

The mass calculation part 89 calculates the mass m by $$m = F1/\beta \qquad (6).$$

Figure 6:
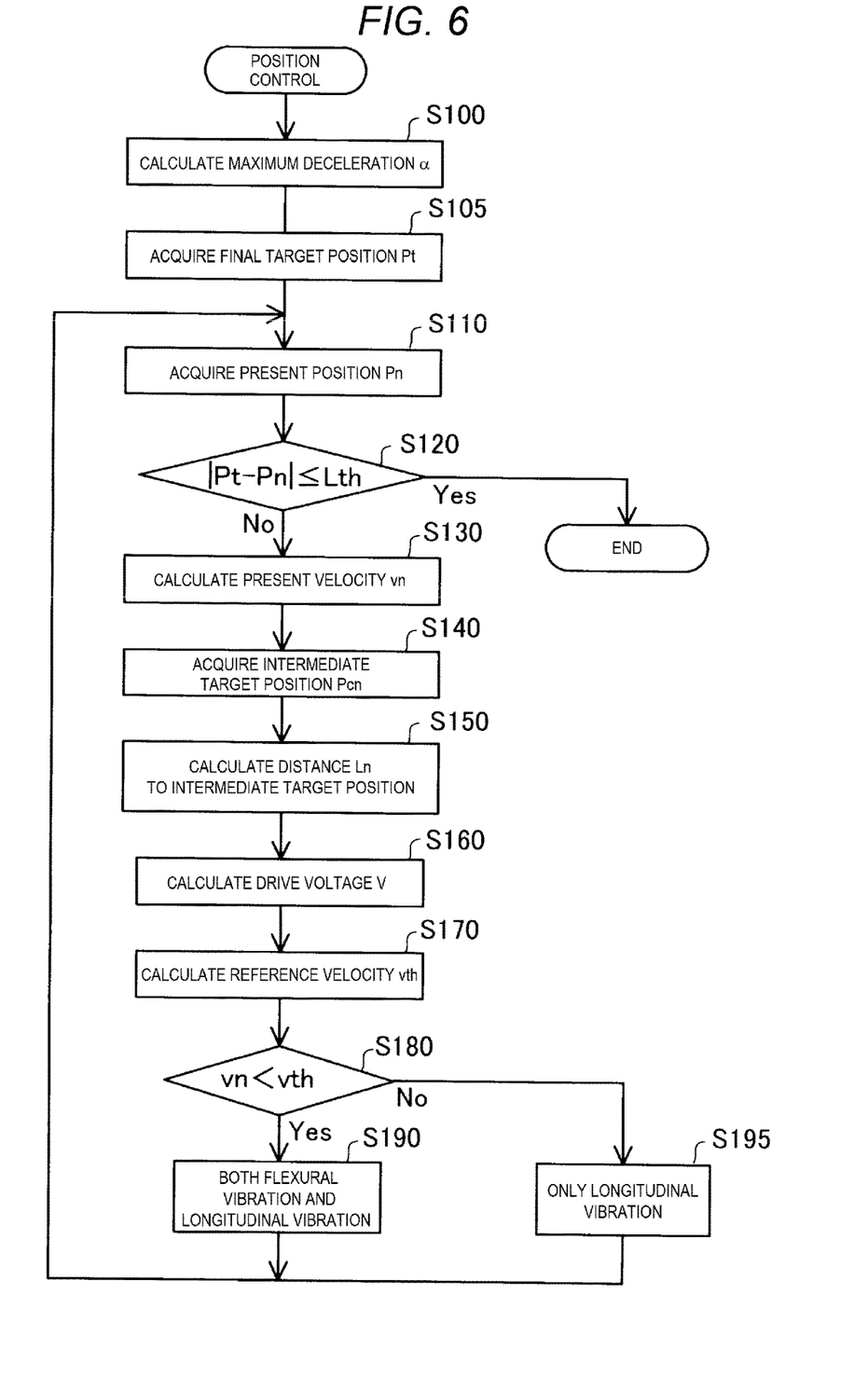
FIG. 6 is a drive control flowchart repeatedly performed by the control unit.

FIG. 6 is a drive control flowchart repeatedly performed by the control unit 70. At step S100, the maximum deceleration calculation part 74 of the control unit 70 calculates the maximum deceleration α of the driven part 40 using the mass m and the maximum friction force F2max. Note that the step S100 may be performed only at the first time. This is because the maximum deceleration α is unchanged if the mass m is unchanged.

At step S105, the control unit 70 acquires the final target position Pt of the driven part 40 from the host control unit

90. At step S110, the control unit 70 acquires the present position Pn of the driven part 40 from the position sensor 60.

At step S120, the control unit 70 determines whether or not a difference |Pt−Pn| between the final target position Pt of the driven part 40 and the present position Pn of the driven part 40 is equal to or smaller than a threshold value Lth. When |Pt−Pn| is equal to or smaller than the threshold value Lth, the position of the driven part 40 is within an error range relative to the final target position Pt, and the control unit 70 ends the processing of this flowchart. When |Pt−Pn| is larger than the threshold value Lth, the control unit 70 moves the processing to step S130.

At step S130, the velocity calculation part 76 of the control unit 70 calculates the velocity vn of the driven part 40 using a position P(n−1) of the driven part 40 in the previous cycle and the position Pn of the driven part 40 in the present cycle.

At step S140, the intermediate target position calculation part 71 of the control unit 70 calculates the intermediate target position Pcn of the driven part 40 after one cycle using the final target position Pt of the driven part 40 acquired from the host control unit 90 and the position Pn of the driven part 40 acquired from the position sensor 60.

At step S150, the residual distance calculation part 72 of the control unit 70 calculates the distance Ln from the present position Pn of the driven part 40 to the intermediate target position Pcn.

At step S160, the voltage setting part 80 of the control unit 70 calculates the voltage V for driving the piezoelectric elements 110a to 110f using the distance Ln to the intermediate target position Pcn and the present velocity vn of the driven part 40. This voltage V corresponds to the drive force F1 and the brake force F2. The voltage setting part 80 limits the voltage V for driving the piezoelectric elements 110a to 110f to the voltage Vlim when the calculated voltage V is higher than the voltage Vlim at which the friction force between the projecting portion 20 and the driven part 40 generates the maximum friction force (maximum drive force F1max or maximum brake force F2max). Note that the voltage Vlim is a known value predetermined by an experiment or the like.

At step S170, the reference velocity calculation part 78 of the control unit 70 calculates the reference velocity vth using the distance Ln to the intermediate target position Pcn and the maximum deceleration α.

At step S180, the velocity determination part 82 of the control unit 70 compares the present velocity vn of the driven part 40 with the reference velocity vth and, when vn<vth, moves the processing to step S190 and, when vn vth, moves the processing to step S195.

At step S190, the control unit 70 drives both the flexural vibration drive portion 87 and the longitudinal vibration drive portion 88 of the drive part 86. Thereby, the drive force F1 is applied to the driven part 40. At step S195, the control unit 70 drives only the longitudinal vibration drive portion 88 of the drive part 86. Thereby, the brake force F2 is applied to the driven part 40.

Figure 7:
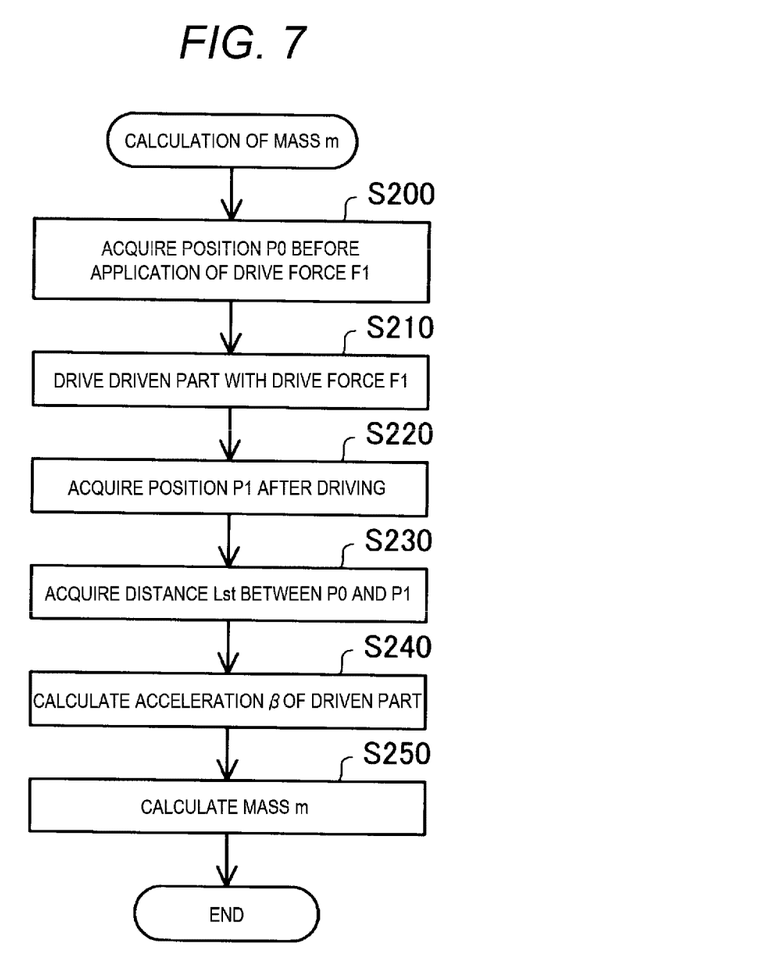
FIG. 7 is a flowchart for calculation of a mass m executed by the control unit.

FIG. 7 is a flowchart for calculation of the mass m executed by the control unit 70. As described above, the mass m is the sum of the mass m1 of the driven part 40 and the mass m2 of the object 50. At step S200, the control unit 70 acquires the position P0 before the application of the drive force to the driven part 40. Note that, before the application of the drive force to the driven part 40, the velocity of the driven part 40 is zero. This is because, when the mass m changes, that is, when the driven part 40 grips or releases the object 50 and the mass m changes, the velocity of the driven part 40 is zero.

At step S210, the control unit 70 drives the driven part 40 with the drive force F1. At step S220, the control unit 70 acquires the position P1 of the driven part 40 after driving. At step S230, the control unit 70 acquires the distance Lst between the position P0 and the position P1.

At step S240, the control unit 70 calculates the acceleration β of the driven part 40. When the time for application of the drive force F1 is t and the acceleration is β, the acceleration β may be calculated using the expression (4).

At step S250, the control unit 70 calculates the mass m. The unit calculates the mass m from the relationship among the drive force F1, the acceleration β, and the mass m using the expression (6). The control unit 70 uses the calculated mass m at step S100 in FIG. 6. Note that, when the mass m2 of the object 50 is known, the mass may be provided from the host control unit 90 and, when the mass m2 of the object 50 is extremely smaller than the mass m1 of the driven part 40, e.g. a thousandth or less, the mass m1 of the driven part 40 may be used as the mass m.

Figure 8:
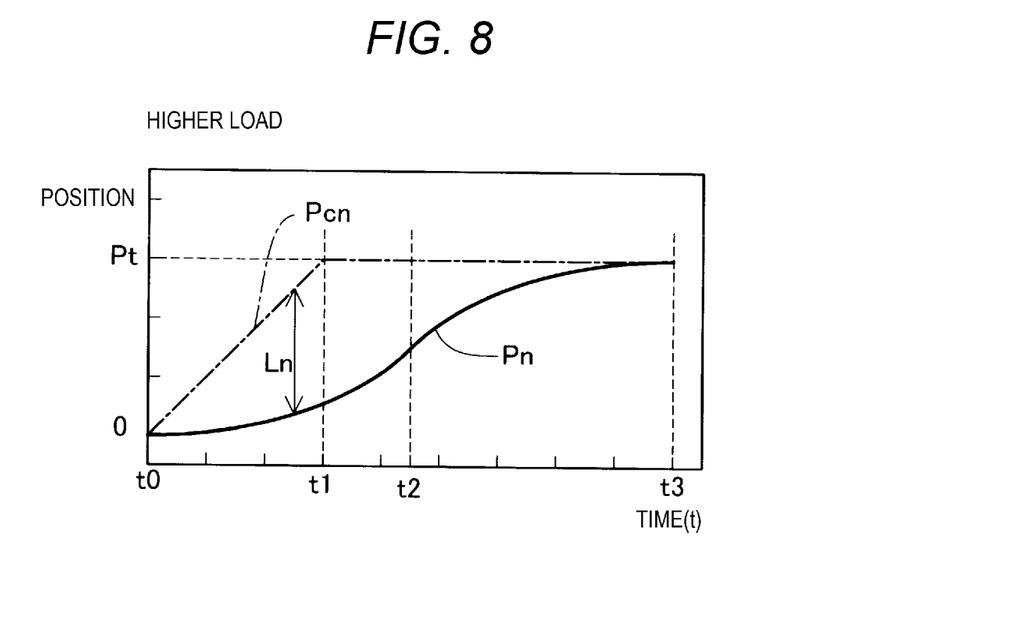
FIG. 8 is an explanatory diagram showing a target position and an actual position of a driven part in a case of a higher load.

FIG. 8 is an explanatory diagram showing the target position Pcn and the actual position Pn of the driven part 40 in a case of a higher load. The case of the higher load is a case where the mass m is larger, that is, a case where the inertia is larger. In this case, even by driving with the maximum drive force F1 as the friction force between the projecting portion 20 and the driven part 40, it is hard to sufficiently accelerate the driven part 40. Accordingly, as shown in FIG. 8, the distance Ln from the present position Pn of the driven part 40 to the intermediate target position Pcn gradually becomes longer. Further, it is also hard to sufficiently decelerate the driven part 40 at braking. Accordingly, in order to stop the driven part 40 at the final target position Pt, the control unit 70 starts braking from a time t2 before the driven part 40 reaches the final target position Pt.

Figure 9:
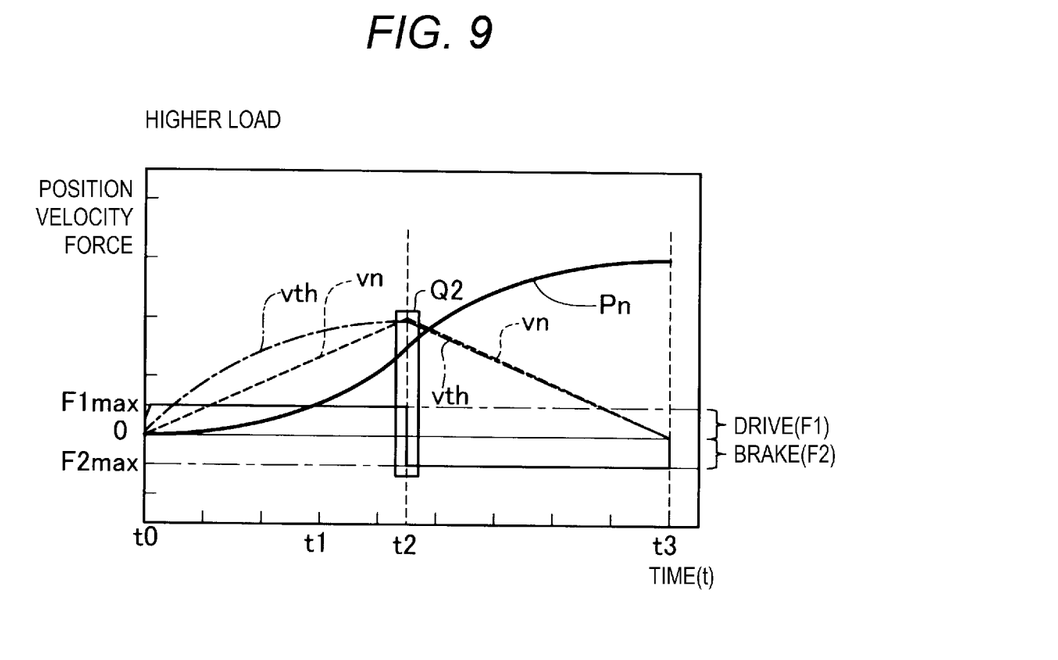
FIG. 9 is an explanatory diagram showing a position and a velocity of the driven part and a force applied to the driven part in the case of the higher load.
Figure 10:
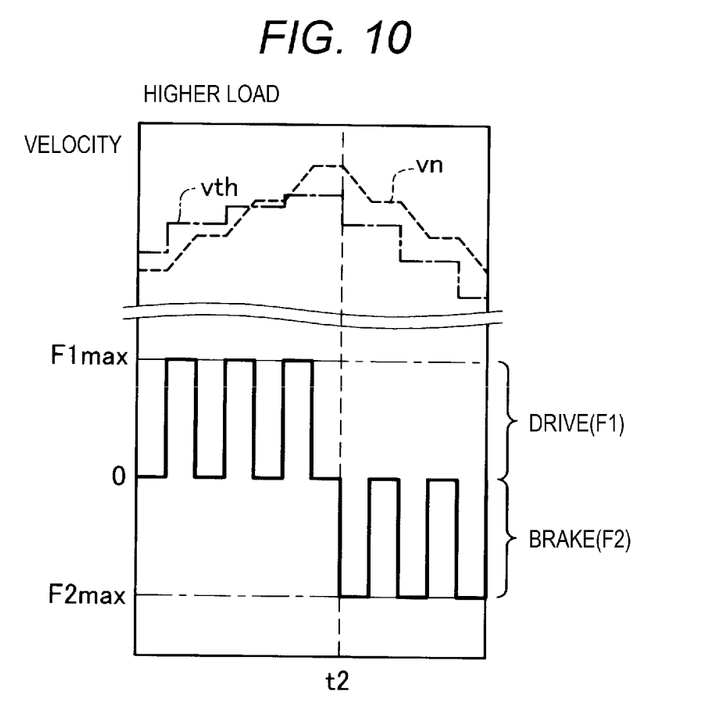
FIG. 10 is an enlarged view of an area Q2 in FIG. 9.

FIG. 9 is an explanatory diagram showing a position and a velocity of the driven part 40 and a force applied to the driven part 40 in the case of the higher load, and FIG. 10 is an enlarged view of an area Q2 in FIG. 9. In the case of the higher load, the drive force F1 at a time t0 is a drive force calculated from the distance Ln to the intermediate target position Pcn and the present velocity vn of the driven part 40 and smaller than the maximum drive force F1max.

In the subsequent cycles, the driven part 40 does not reach the intermediate target position Pcn, and thus, the distance Ln from the present position Pn of the driven part 40 to the intermediate target position Pcn is larger. Accordingly, in the case of the higher load, the drive force F1 gradually becomes larger. Then, when the drive force calculated using the distance Ln to the intermediate target position Pcn and the present velocity vn of the driven part 40 becomes equal to or larger than the maximum drive force F1max, the control unit 70 drives the driven part 40 with the maximum drive force F1max. Note that, at and after a time t1, the intermediate target position Pcn coincides with the final target position Pt. Therefore, the distance Ln increases to the time t1, and then, decreases.

The driven part 40 is driven with the maximum drive force F1max, and thereby, the velocity vn of the driven part 40 linearly increases. On the other hand, as known from the expression (3), the reference velocity vth is proportional to a square root of the distance Ln. As a result, the velocity vn of the driven part 40 becomes higher than the reference velocity vth at the time t2. Note that the distance Ln becomes smaller from the time t1 to the time t2, however, the reference velocity vth is higher than the velocity vn of the driven part 40.

When the velocity vn of the driven part 40 becomes higher than the reference velocity vth at the time t2, the part is braked with the brake force F2max by simple harmonic motion in the subsequent cycles by the processing at steps S180, S195 in FIG. 6. Here, the reference velocity vth is a value at which, when the driven part 40 is decelerated with the maximum friction force F2max and the driven part 40 reaches the final target position Pt, the velocity vn of the driven part 40 becomes zero. Therefore, the velocity vn of the driven part 40 is not lower than the reference velocity with to a time t3 when the driven part 40 reaches the final target position Pt.

In the case of the higher load, the part is driven with the maximum drive force F1max to the time t2 and driven with the brake force F2max from the time t2 to the time t3. At the time t3, the driven part 40 reaches the final target position Pt and the velocity vn of the driven part 40 becomes zero.

Figure 11:
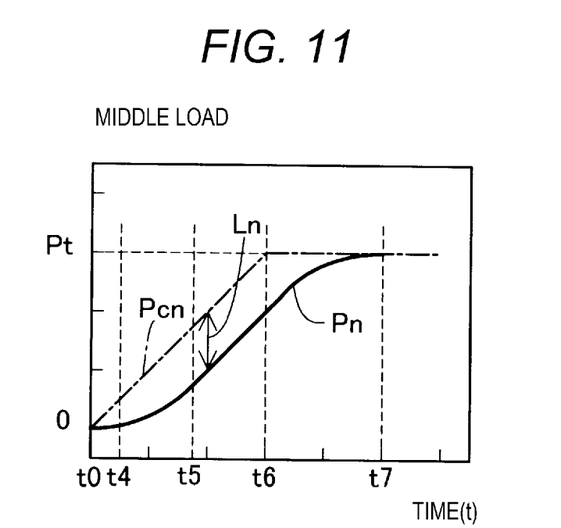
FIG. 11 is an explanatory diagram showing a target position and an actual position of the driven part in a case of a middle load.
Figure 12:
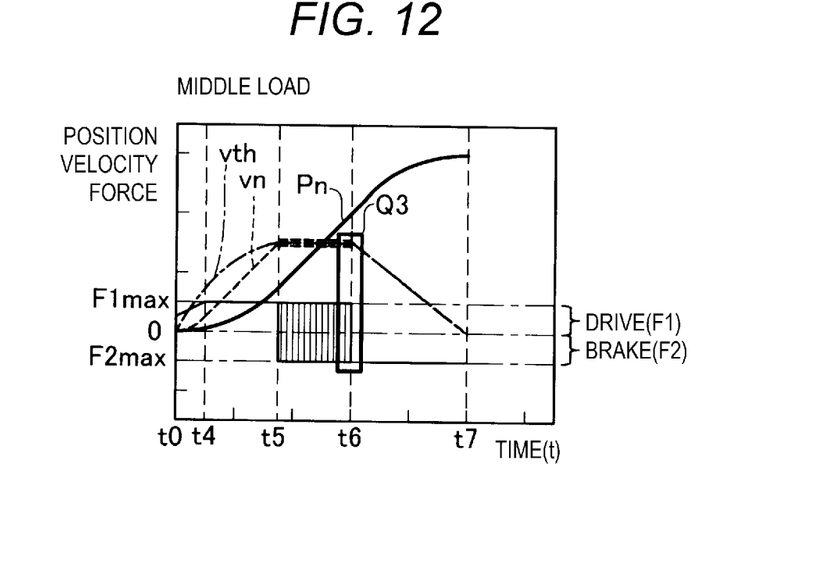
FIG. 12 is an explanatory diagram showing a position and a velocity of the driven part and a force applied to the driven part in the case of the middle load.
Figure 13:
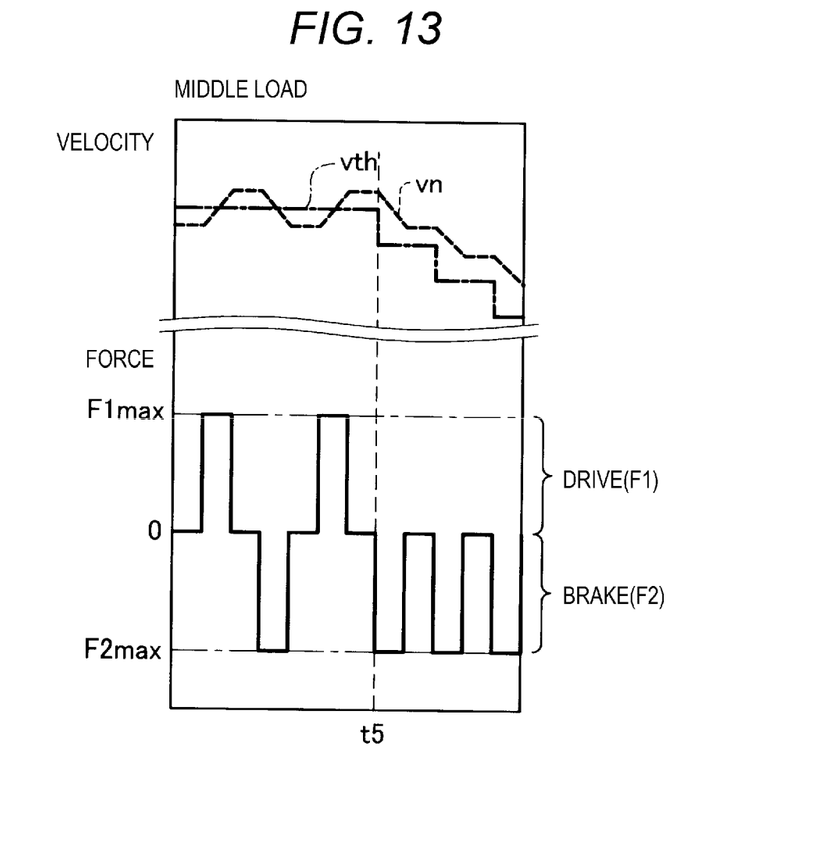
FIG. 13 is an enlarged view of an area Q3 in FIG. 13.

FIG. 11 is an explanatory diagram showing a target position and an actual position of the driven part 40 in a case of a middle load. FIG. 12 is an explanatory diagram showing a position and a velocity of the driven part 40 and a force applied to the driven part 40 in the case of the middle load, and FIG. 13 is an enlarged view of an area Q3 in FIG. 13.

In the case of the middle load, the drive force F1 from the time T0 to the time t4 is a drive force calculated from the distance Ln to the intermediate target position Pcn and the present velocity vn of the driven part 40 and smaller than the maximum drive force F1max. Note that, in the respective cycles, the driven part 40 does not reach the intermediate target position Pcn and the distance Ln to the intermediate target position Pcn becomes larger. Therefore, the drive force F1 also becomes larger. At the time t4, the drive force F1 becomes the maximum drive force F1max.

The drive force F1 from the time t4 to a time t5 is the maximum drive force F1max. In this period, as is the case with the higher load, the driven part 40 is driven with the maximum drive force F1max and the velocity vn of the driven part 40 linearly increases. On the other hand, as known from the expression (3), the reference velocity vth is proportional to a square root of the distance Ln. As a result, the velocity vn of the driven part 40 becomes substantially equal to the reference velocity vth at the time t5.

From the time t5 to a time t6, from a comparison result between the velocity vn and the reference velocity vth, the driven part 40 is driven with the maximum drive force F1max or braked with the maximum friction force F2max. In this period, the distance Ln is substantially constant and the reference velocity vth is also substantially constant. When the velocity vn of the driven part 40 is lower than the reference velocity vth, the part is driven with the maximum drive force F1max and, when the velocity vn of the driven part 40 is higher than the increased reference velocity vth, the part is braked with the maximum friction force F2max.

After the time t6, the intermediate target position Pcn coincides with the final target position Pt, and the distance Ln gradually becomes smaller and the reference velocity vth also gradually becomes lower. After the time t6, the driven part 40 is braked with the maximum friction force F2max. At a time t7, the driven part 40 reaches the final target position Pt and the velocity vn of the driven part 40 becomes zero.

As described above, according to the embodiment, the control unit 70 calculates the reference velocity vth of the driven part 40 at which the driven part 40 may be stopped at the final target position Pt when the part is braked with the maximum friction force and acquires the present velocity vn of the driven part 40. When the present velocity vn of the driven part 40 is lower than the reference velocity vth, the drive force is applied from the piezoelectric drive device main body 30 to the driven part 40 with the force as not larger one of the drive force F1 calculated from the distance Ln and the velocity vn and the maximum drive force F1max between the piezoelectric drive device and the driven part 40 and, when the present velocity vn of the driven part is equal to or higher than the reference velocity vth, the brake force is applied from the piezoelectric drive device main body 30 to the driven part 40, and thereby, the driven part 40 may be stopped at the target position Pt. That is, accurate position control may be performed regardless of the magnitude of the inertia of the driven part 40.

In the above described embodiment, the drive force is applied with the force as not larger one of the drive force F1 calculated from the distance Ln and the velocity vn and the maximum drive force F1max between the piezoelectric drive device and the driven part 40, however, the maximum drive force F1max may be applied. It is unnecessary to calculate the drive force F1 from the distance Ln and the velocity vn. On the other hand, when the drive force F1 calculated from the distance Ln and the velocity vn is applied, unnecessary acceleration may be suppressed.

In the embodiment, when the driven part 40 is braked, as explained in FIGS. 4A and 4B, the voltage is applied to the piezoelectric elements 110b, 110e, then, no voltage is applied thereto, and thereby, the vibrating plate 200 is longitudinally vibrated. However, the voltage may be continued to be applied to the piezoelectric elements 110b, 110e and the piezoelectric elements 110b, 110e may be extended. The second half of the cycle may be braked.

In the embodiment, when the driven part 40 is braked, voltages may be applied to all of the piezoelectric elements 110a to 110f or voltages may be applied to the piezoelectric elements 110a, 110c, 110d, 110f. In this case, the piezoelectric elements in the symmetrical positions to each other with respect to the A direction are driven at the same time, and thereby, longitudinally vibrated, but not flexurally vibrated.

In the embodiment, the graphs are created with the maximum drive force F1max and the maximum friction force F2max equal to each other, however, the maximum drive force F1max and the maximum friction force F2max may be different. In the case of the higher load, the position and the velocity vn of the driven part 40 and the time of switching from driving to braking change, but the control does not change. The same applies to the drive force F1 and the friction force F2. For example, in the case of the middle load as shown in FIGS. 12 and 13, from the time t5 to the time t6, the drive force F1 and the friction force F2 are alternately applied. In a case of F1=2·F2, the control unit 70 drives for one cycle, then, brakes for two cycles, and thereby, may make the velocity vn of the driven part 40 to be zero after the three cycles. In a case of 2·F1=3·F2, the control unit 70 drives, brakes, brakes, drives, and brakes, and thereby, may make the velocity vn of the driven part 40 to be zero after the five cycles. When a ratio between F1 and F2 is n:m, similarly, the velocity vn of the driven part 40 may be made to be zero after n+m cycles.

In the above explanation, the movement direction of the driven part 40 is not mentioned, however, a force of m·g·sin θ is added or subtracted depending on the direction of motion. Note that, in a case of the horizontal direction, θ=0 and, in a case of the vertical direction, θ=90°. In these cases, the expression (5) is transformed to the following expressions (7) and (8) depending on the movement direction of the driven part 40.

$$F1 + m \cdot g \cdot \sin\theta = \beta 1 \cdot m \quad (7)$$

$$F1 - m \cdot g \cdot \sin\theta = \beta 2 \cdot m \quad (8)$$

Unknowns are m and θ and there are the two expressions, and thereby, both the mass m and θ may be obtained. Hereinafter, the drive force F1 may be F1+m·g·sin θ or F1−m·g·sin θ according to the movement direction of the driven part 40. The same applies to the brake force F2.

Second Embodiment

In the first embodiment, the intermediate target position Pcn is set and the position and the velocity of the driven part 40 are controlled using the distance Ln from the present position Pn to the intermediate target position Pcn. In the second embodiment, the intermediate target position Pcn is not set and the position and the velocity of the driven part 40 are controlled using a distance from the present position Pn to the final target position Pt. A control flowchart of the second embodiment is substantially the same as that shown in FIG. 6, however, step S140 is not executed and the distance Ln to the final target position Pt is calculated at step S150.

Figure 14:
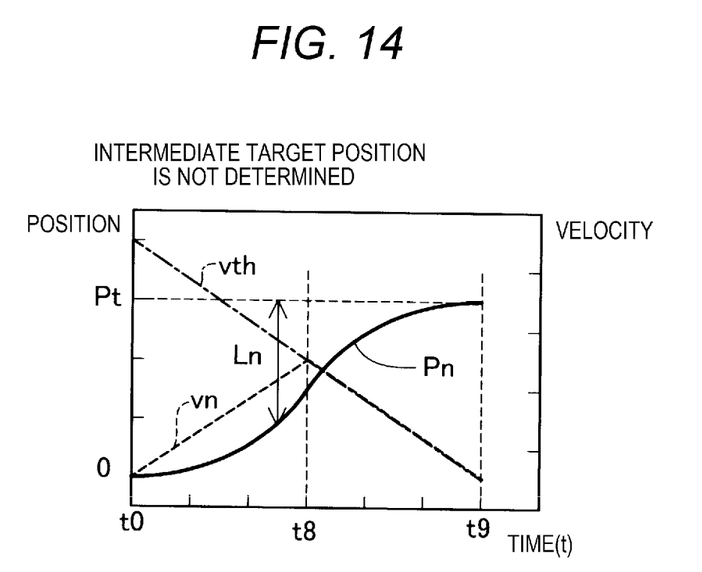
FIG. 14 is an explanatory diagram showing a position, a velocity, and a reference velocity of the driven part when an intermediate target position is not determined.

FIG. 14 is an explanatory diagram showing the position Pn, the velocity vn, and the reference velocity vth of the driven part 40 when the intermediate target position Pcn is not determined. As time passes, the driven part 40 moves closer to the final target position and the distance Ln becomes smaller. As a result, the reference velocity vth monotonously becomes lower. On the other hand, the driven part 40 is subjected to the drive force F1 according to the distance Ln and monotonously becomes faster. The drive force F1 is e.g. the maximum drive force F1max. At a time t8, the velocity vn of the driven part 40 is higher than the reference velocity vth, and thus, the part is braked with the friction force F2 after the time t8. As a result, at a time t9, the driven part 40 reaches the final target position Pt and the velocity vn becomes zero.

The movement of the first embodiment with the higher load when the intermediate target position Pcn is determined and the movement when the intermediate target position Pcn is not determined are the same except the following two points.

(a) In the case of the higher load, the drive force F1 at the time t0 is the drive force calculated from the distance Ln to the intermediate target position Pcn and the present velocity vn of the driven part 40 and smaller than the maximum drive force F1max, however, when the intermediate target position Pcn is not determined, the maximum drive force F1max.

(b) In the case of the higher load, the reference velocity vth increases to the middle (time t2), and then, decreases, however, when the intermediate target position Pcn is not determined, the reference velocity vth is the highest at t0 and monotonously decreases.

As described above, it is known that the intermediate target position Pcn may be determined or, when not determined, the control may be performed in the same manner. In the case where the intermediate target position Pcn is determined, when the mass m is lighter, the drive force F1 may be made smaller and overshoot of the stop position of the driven part 40 is easily suppressed. In the case where the intermediate target position Pcn is not determined, the intermediate target position calculation part 71 is unnecessary.

The present disclosure is not limited to the above described embodiments, but may be realized in various aspects without departing from the scope thereof. For example, the present disclosure can be realized in the following aspects. The technical features in the above described embodiments corresponding to the technical features in the following respective aspects can be appropriately replaced or combined for solving part or all of the challenges of the present disclosure or achieving part or all of the effects of the present disclosure. Further, when the technical features are not explained as essential features in this specification, the technical features can be appropriately deleted.

(1) According to one aspect of the present disclosure, a control method for a piezoelectric drive device that drives a driven part is provided. The control method includes calculating a reference velocity vth of the driven part using a maximum deceleration α applied to the driven part by the piezoelectric drive device and a distance Ln from a present position of the driven part to a target position, and performing control to apply a drive force from the piezoelectric drive device to the driven part when a present velocity vn of the driven part is lower than the reference velocity vth, and apply a brake force from the piezoelectric drive device to the driven part when the present velocity vn is equal to or higher than the reference velocity vth. According to the aspect, the piezoelectric drive device calculates the reference velocity of the driven part at which the driven part may be stopped at a final target position when the part is braked with the maximum friction force, acquires the present velocity of the driven part, and applies the drive force from the piezoelectric drive device to the driven part when the present velocity of the driven part is lower than the reference velocity, and applies the brake force from the piezoelectric drive device to the driven part when the present velocity of the driven part is equal to or higher than the reference velocity. Thereby, the driven part may be stopped at the target position. That is, accurate position control may be performed regardless of magnitude of inertia of the driven part.

(2) In the above described aspect, the piezoelectric drive device includes a first piezoelectric element that flexurally vibrates the piezoelectric drive device to apply the drive force, and a second piezoelectric element that longitudinally vibrates the piezoelectric drive device to apply the brake force, and the first piezoelectric element may be controlled not to flexurally vibrate, but the second piezoelectric element may be controlled to longitudinally vibrate when the brake force is applied. According to the aspect, the brake force may be applied by longitudinal vibration of the second piezoelectric element.

(3) In the above described aspect, the maximum deceleration α may be obtained using a mass m of the driven part and a maximum friction force F2max between the piezoelectric drive device and the driven part. According to the aspect, the maximum deceleration α may be obtained even when the mass m changes.

(4) In the above described aspect, a mass m of the driven part may be calculated using a position of the driven part before the driven part is driven, a position of the driven part after the driven part is driven, the drive force that drives the driven part, and time for driving the driven part. According to the aspect, the mass m of the driven part may be easily calculated.

(5) In the above described aspect, the distance Ln and the reference velocity with are obtained on a regular basis. According to the aspect, the driven part may be accurately controlled.

The present disclosure can be realized in other various aspects than the control method for the piezoelectric drive device. For example, the present disclosure may be realized in aspects of a piezoelectric drive device, a motor or a robot including a piezoelectric drive device, etc.

What is claimed is:

1. A control method for a piezoelectric drive device that drives a driven part, comprising:
calculating a reference velocity vth of the driven part using a maximum deceleration α applied to the driven part by the piezoelectric drive device and a distance Ln from a present position of the driven part to a target position; and
performing control to apply a drive force from the piezoelectric drive device to the driven part when a present velocity vn of the driven part is lower than the reference velocity vth, and apply a brake force from the piezoelectric drive device to the driven part when the present velocity vn is equal to or higher than the reference velocity vth.

2. The control method according to claim 1, wherein the piezoelectric drive device includes:
a first piezoelectric element that flexurally vibrates the piezoelectric drive device to apply the drive force; and
a second piezoelectric element that longitudinally vibrates the piezoelectric drive device to apply the brake force, and
the first piezoelectric element is controlled not to flexurally vibrate, but the second piezoelectric element is controlled to longitudinally vibrate when the brake force is applied.

3. The control method according to claim 1, wherein the maximum deceleration α is obtained using a mass m of the driven part and a maximum friction force F2max between the piezoelectric drive device and the driven part.

4. The control method according to claim 1, wherein a mass m of the driven part is calculated using a position of the driven part before the driven part is driven, a position of the driven part after the driven part is driven, the drive force that drives the driven part, and time for driving the driven part.

5. The control method according to claim 1, wherein the distance Ln and the reference velocity with are obtained on a regular basis.

6. A piezoelectric drive device that drives a driven part, comprising:
a vibrating plate on which a plurality of piezoelectric elements are provided;
a projecting portion provided in the vibrating plate;
the driven part configured to contact the projecting portion;
a control unit that controls a movement of the piezoelectric drive device by controlling a voltage applied to the piezoelectric elements; and
a position sensor that detects a present position of the driven part, wherein
the control unit calculates a maximum deceleration α applied to the driven part by the piezoelectric drive device using a maximum friction force F2max between the piezoelectric drive device and the driven part and a mass m of the driven part,
calculates a distance Ln to a target position from the present position of the driven part detected by the position sensor,
calculates a reference velocity vth of the driven part using the maximum deceleration α and the distance Ln from the present position of the driven part to the target position,
calculates a present velocity vn of the driven part from a temporal change of the present position of the driven part detected by the position sensor, and
performs control to apply a drive force from the piezoelectric drive device to the driven part when the present velocity vn is lower than the reference velocity vth, and apply a brake force from the piezoelectric drive device to the driven part when the present velocity vn is equal to or higher than the reference velocity vth.

7. The piezoelectric drive device according to claim 6, comprising a first piezoelectric element that flexurally vibrates the piezoelectric drive device, and a second piezoelectric element that longitudinally vibrates the piezoelectric drive device as the plurality of piezoelectric elements, wherein
the control unit controls the first piezoelectric element not to flexurally vibrate, but the second piezoelectric element to longitudinally vibrate when applying the brake force.

8. The piezoelectric drive device according to claim 6, further comprising a maximum deceleration calculation part that obtains the maximum deceleration α using the mass m of the driven part and the maximum friction force F2max between the piezoelectric drive device and the driven part.

9. The piezoelectric drive device according to claim 6, further comprising a mass calculation part that calculates the mass m of the driven part using a position of the driven part before the driven part is driven, a position of the driven part after the driven part is driven, the drive force that drives the driven part, and time for driving the driven part.

10. The piezoelectric drive device according to claim 6, wherein
the control unit obtains the distance Ln and the reference velocity with on a regular basis.

* * * * *